United States Patent [19]

Frey et al.

[11] 3,994,995

[45] *Nov. 30, 1976

[54] THERMOPLASTIC COMPOSITION COMPRISING PVC AND CHLORINATED POLYETHYLENE

[75] Inventors: Hans-Helmut Frey, Bad Soden, Taunus; Helmut Klug, Aystetten, both of Germany

[73] Assignee: Hoechst Aktiengesellschaft, Frankfurt am Main, Germany

[ * ] Notice: The portion of the term of this patent subsequent to Feb. 24, 1993, has been disclaimed.

[22] Filed: Jan. 3, 1975

[21] Appl. No.: 538,398

Related U.S. Application Data

[63] Continuation of Ser. No. 421,529, Dec. 4, 1973, abandoned.

[30] Foreign Application Priority Data

Aug. 31, 1973 Germany............................ 2343982

[52] U.S. Cl. .................... 260/897 C; 260/29.1 SB; 526/29; 526/45
[51] Int. Cl.² .................... C08L 23/28; C08J 3/00
[58] Field of Search.................... 260/897; 526/29

[56] References Cited

UNITED STATES PATENTS

| | | | |
|---|---|---|---|
| 2,926,159 | 2/1960 | Tinsley.............................. | 260/88.2 |
| 3,006,889 | 10/1961 | Frey.................................. | 260/897 |
| 3,227,781 | 1/1966 | Klug et al. ......................... | 260/897 |

*Primary Examiner*—Carman J. Seccuro
*Attorney, Agent, or Firm*—Connolly and Hutz

[57] ABSTRACT

Blends of vinyl chloride polymers and chlorination products of polyolefins well suitable for dry blend technique are obtained by using a chlorinated low pressure polyethylene prepared by chlorinating in aqueous hydrochloric acid, preferably in the presence of silicic acid having a large surface and a siloxane oil.

6 Claims, No Drawings

THERMOPLASTIC COMPOSITION COMPRISING PVC AND CHLORINATED POLYETHYLENE

This application is a continuation of application Ser. No. 421,529 filed Dec. 4, 1973 and now abandoned.

This invention relates to a thermoplastic composition consisting of a vinyl chloride polymer and a chlorinated low pressure polyethylene.

It has been proposed to elastify polyvinyl chloride and vinyl chloride copolymers by the addition of chlorination products of polyolefins obtained by chlorinating polyolefins in aqueous suspension and having a chlorine content of from 25 to 50 % by weight (cf. German Pat. No. 1,469,990 and German Pat. Nos. 1,236,774 and 1,266,969).

To obtain chlorination products having a good elastifying effect combined with a sufficient fineness of grain the chlorination has to be carried out in the presence of fine-grained inert, inorganic or organic additives to avoid agglomeration. As inorganic additives silicic acid or kieselguhr have been proposed (cf. German Pat. No. 1,420,407).

The relatively large amount of silicic acid, which must be added to the chlorination reaction as anti-agglomeration agent and which partially remains in the final blend when the chloropolyolefin is mixed with polyvinyl chloride, has a detrimental effect on the rheological and mechanical properties of the blend.

It has now been found that mixtures of vinyl chloride polymers and chlorination products of polyolefins can be produced which do not have the aforesaid disadvantages and are well suitable for dry blend technique by using a chlorinated low pressure polyethylene prepared by chlorinating in aqueous hydrochloric acid, preferably in the presence of silicic acid having a large surface and a siloxane oil.

The present invention provides a thermoplastic composition essentially consisting of
a. 98 to 50 % by weight of a vinyl chloride polymer and
b. 2 to 50 % by weight of a chlorinated low pressure polyethylene, having a chlorine content of 25 to 42 % by weight, a reduced specific viscosity of 1 to 5 dl/g, a residue value of 2 to 40 %, measured by extraction with toluene/acetone in a proportion of 1 : 1, and a swelling value of 10 to 70 %, measured in methylcyclohexane, and obtained by chlorinating a low pressure polyethylene in aqueous hydrochloric acid having a strength of from 10 to 35 %, preferably 15 to 30 % in the presence of 0 to 2 % by weight of silicic acid and 0 to 1.0 % by weight of a siloxane oil, the percentages being calculated on the low pressure polyethylene used, at a chlorination temperature of from 50° to 130° C, at least 10 % by weight of chlorine being incorporated at a temperature of from 120° to 130° C.

The present invention also provides a process for the manufacture of a thermoplastic composition by mixing
a. 98 to 50 % by weight of a vinyl chloride polymer and
b. 2 to 50 % by weight of a chlorinated low pressure polyethylene having a chlorine content of from 25 to 42 % by weight, a reduced specific viscosity of 1 to 5 dl/g, a residue value of from 2 to 40 %, measured by extraction with toluene/acetone in a proportion of 1 : 1, and a swelling value of from 10 to 70 %, measured in methylcyclohexane, prepared by chlorinating a preferably fine-grained low pressure polyethylene in aqueous hydrochloric acid of 10 to 35 %, preferably 15 to 30 %, strength in the presence of 0 to 2 % by weight of silicic acid and 0 to 1.0 % by weight of a siloxane oil, the percentages being calculated on the starting polyethylene, at a chlorination temperature of from 50° to 130° C, the low pressure polyethylene being possibly thermally treated or presintered at a temperature in the range of from 100° C to its crystallite melting point and at least 10 % of the chlorine being incorporated at a temperature of from 120° to 130° C.

The thermoplastic composition consists of 98 to 50 % by weight, preferably 95 to 80 % by weight, of polyvinyl chloride or a copolymer of vinyl chloride with other comonomers, such as vinyl acetate, acrylic acid esters or methacrylic acid esters, the amount of comonomer units in the polymer being at most 20 % by weight, preferably 1 to 5 % by weight. The K value of the polymer is expediently in a range of from 50 to 80.

The remaining 2 to 50 % by weight, preferably 2 to 20 % by weight of the thermoplastic composition of the invention consists of a chlorinated low pressure polyethylene of high molecular weight containing 25 to 42 % by weight, preferably 30 to 40 % by weight, of chlorine. The distribution of the chlorine atomes in the polyethylene grains, i.e. the degree of "penetrating or through chlorination" is characterized by the residue value according to the toluene/acetone method and the swelling value in methylcyclohexane. The chlorinated low pressure polyethylene suitable for making the compositions of the invention shall have a residue value of 2 to 40 %, preferably 2 to 30 %, and a swelling value of 10 to 70 %, preferably 20 to 50 %. Moreover, it shall have a reduced specific viscosity of 1 to 5 dl/g, preferably 1 to 3.5 dl/g.

The chlorinated low pressure polyethylene of high molecular weight is fine-grained and can readily be mixed homogeneously with the vinyl chloride polymer powder.

The chlorinated low pressure polyethylene to be used according to the invention is produced by chlorinating fine-grained low pressure polyethylene, which may have been thermally treated or pre-sintered for 5 to 300 minutes at a temperature of from 100° C to its crystallite melting point (cf. German Offenlegungsschrift 1,720,800), in hydrochloric acid; expediently 3 to 30 times the amount of acid is used, referred to the low pressure polyethylene. The chlorination is started at a temperature of from 50° to 100° C and terminated at 120° and 130° C.

The chlorination is advantageously started in a temperature range of from 70° to 90° C, continued with continual temperature increase and terminated at a temperature ranging from 120° to 130° C. Alternatively, the chlorination can be effected in two steps, i.e. it is started at a temperature of from 50° C to 100° C, the chlorine supply is interrupted while the temperature is raised to 120° to 130° C and the chlorination is then continued and terminated at that temperature.

The low pressure polyethylene used as starting material has a reduced specific viscosity of 1 to 5 dl/g, preferably 1 to 3.5 dl/g.

By silicic acid present in the chlorination as agglomeration inhibitor the various hydrous or anhydrous types of finely porous silicon dioxide preferably having a large surface are understood. Their inner surface should expediently be in the range of from 50 to 400 cm$^2$/g according to BET (Brunauer, Emmet and Teller), preferably 150 to 300 cm$^2$/g.

In general the silicic acid has a mean particle size of from 1 to 50 μm.

By the addition of silicic acid and siloxane oil the antiagglomeration effect of hydrochloric acid is improved. Such an addition is therefore preferred. In general 0.1 to 2 %, preferably 0.1 to 1 % by weight of silicic acid in combination with 0.01 to 1.0, preferably 0.02 to 0.7 % by weight, of siloxane oil, each time calculated on the low pressure polyethylene used, are sufficient. The amount of silicic acid and siloxane oil is not strictly limited, in some cases higher amounts may also be used, whereby the agglomeration inhibition is further improved but disadvantages for the blend with polyvinyl chloride must be taken into consideration.

The organo-silicon compounds or siloxane oils to be used according to the invention are liquid polysiloxanes consisting of the recurring unit

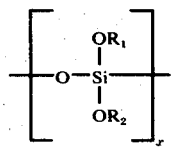

in which $R_1$ and $R_2$ each represents an alkyl radical preferably having 1 to 12 carbon atoms, an aryl radical preferably having 6 to 10 carbon atoms or an aralkyl radical preferably having 7 to 12 carbon atoms, and x is an integer of from 10 to 10,000, preferably 100 to 1,000. The viscosity of the siloxane oils at 25° C is suitably in the range of from 100 to 500,000 centistokes, more suitably 500 to 50,000 centistokes. There are mentioned, by way of example, dimethyl-, diethyl-, dipropyl-, methyl-ethyl-, dioctyl-, dihexyl-, methyl-propyl-, dibutyl- and didodecyl-polysiloxanes. Compounds of the dimethyl-polysiloxane series proved to be especially advantageous.

The silicic acid component and the polysiloxane, which are possibly pre-mixed, are expediently added prior to or at the beginning of the chlorination within a temperature interval in which the melting point of the polyethylene is not yet reached.

According to another mode of operation the silicic acid is first added alone and the siloxane oil is then admixed during the course of chlorination. A possible slight agglomeration can be counter-acted at least partially by the later addition of siloxane oil, even if it is made prior to drying.

It is also possible, of course, to add the intended amount of siloxane oil in portions during some or all process steps.

The thermoplastic composition according to the invention may additionally contain known PVC stabilizers, for example barium or cadmium laurate, epoxide stabilizers, organic phosphites, tin or lead compounds, as well as other known additives, for example UV absorbers, lubricants, processing auxiliaries, dyes and pigments.

Depending on the proportion of chlorinated low pressure polyethylene, the thermoplastic composition of the invention can be used for making pipes, profiles, plates, sheets, cables, flexible tubes, injection moulded articles and other shaped structures. Owing to the uniform fineness of the grain, the composition can be easily processed by the dry blend technique. Mixing of the components in the plasticized state is not required.

To characterize the chlorinated low pressure polyethylenes to be used according to the invention the following methods were used:

1. Residue value according to the toluene/acetone (TAC) method: 4 grams of the chloropolyethylene to be tested were refluxed for 1 hour in 100 ml of a 1 : 1 mixture of toluene and acetone. The amount of insoluble residue consisting of insufficiently chlorinated portions is a measurement for the through chlorination of the polyethylene particles. The smaller the residue the better the chlorination product is suitable for the compositions of the invention.

2. Swelling value in methylcyclohexane (MCH): The increase in weight of a sample after a 24 hour storage in methylcyclohexane is a further measurement for the through chlorination of the polyethylene particles. Portions which have not been chlorinated to a sufficient extent swell very little. Products having a high swelling value are especially suitable.

The following examples illustrate the invention.

EXAMPLE 1

The chloropolyethylene used was prepared as follows: In a chlorination vessel 100 parts by weight of low pressure polyethylene having a reduced specific viscosity of 1.3 dl/g, in 900 parts by weight of 20 % hydrochloric acid were chlorinated, first at 80° C until a chlorine content of 28 % by weight had been reached and then at 121.5° C to a final chlorine content of 39.2 % by weight.

The product had a TAC value of 13 % and a MCH value of 14 %.

A mixture of 10 parts by weight of the above chlorination product and 90 parts by weight of suspension polyvinyl chloride having a K value of 70 was rolled for 10 minutes at 175° C with the addition of 3 parts by weight of barium/cadmium stabilizer and 1 part by weight of diphenyl-octyl phosphite. The plates moulded from the blend had the following values Notched impact strength according to DIN 53,453 41.7 cm g/cm$^2$ Impact strength at −20° C according to DIN 53,453 "without break" Notched tensile impact strength (DIN 53,448) 197 cmkg/cm$^2$

COMPARATIVE EXAMPLE

The same low pressure polyethylene was chlorinated under the conditions specified above, but in water without addition of hydrochloric acid. The polymer agglomerated to a large extent so that further chlorination was much impeded. A chlorination product was obtained having a chlorine content of 39.1 % by weight, a TAC value of 45 % and a MCH value of 3 %. A blend of 10 % by weight of the said chlorination product with 90 % by weight of suspension polyvinyl chloride having a K value of 70, prepared under the conditions of Example 1, was found to have a notched impact strength of 19.2 cmkg/cm$^2$ and an impact strength at −20° C "without break", according to DIN 53,453, and a notched tensile impact strength of 102 cmkg/cm$^2$ according to DIN 53,448.

EXAMPLE 2

In a chlorination vessel 100 parts by weight of low pressure polyethylene having a reduced specific viscosity of 1.2 dl/g in 1200 parts by weight of 24 % hydrochloric acid to which 0.48 part by weight of silicic acid having a mean particle size of 12 μm and an inner surface of 200 cm$^2$/g (BET) and 0.048 part by weight of siloxane oil having a viscosity of 1,000 centistokes at 25° C had been added, were chlorinated, first at 80° C to a chlorine content of 20 % by weight, then the temperature was raised to 122° C and chlorination was continued until a chlorine content of 6.6 % by weight was reached. The product had a TAC value of 33 % and a MCH value of 16 %.

A blend of 10 parts of the chloropolyethylene obtained with 90 parts of suspension PVC having a K value of 70, prepared under the conditions specified in Example 1, had a notched impact strength of 38.9 cmkg/cm² and an impact strength at −20° C "without break".

EXAMPLE 3

In a chlorination vessel 100 parts by weight of low pressure polyethylene having a reduced specific viscosity of 3.5 dl/g in 1,000 parts by weight of 20 % by weight hydrochloric acid were chlorinated first at 70° C to a chlorine content of 20 % by weight, then the temperature was raised to 126° C and chlorination was continued to a final chlorine content of 36.3 % by weight. The product obtained had a TAC value of 15 % and a MCH value of 21 %.

A blend of 10 parts by weight of the chloropolyethylene with 90 parts by weight of suspension PVC having a K value of 70, prepared according to claim 1, had a notched impact strength of 51.3 cmkg/cm² and an impact strength at −20° C "without break".

What is claimed is:

1. Thermoplastic composition essentially consisting of
   a. 98 to 50% by weight of a vinyl chloride polymer and
   b. 2 to 50% by weight of a chlorinated low pressure polyethylene having a chlorine content of 25 to 42% by weight, a reduced specific viscosity of 1 to 5 dl/g, a residue value of 2 to 40%, measured by extraction in a 1 : 1 mixture of toluene and acetone, and a swelling value of 10 to 70%, measured in methylcyclohexane, the chloro-poly-ethylene being prepared by chlorination of low pressure polyethylene in aqueous hydrochloric acid of 10 to 35% strength by weight in the presence of 0.1 to 2% by weight of silicic acid and 0.01 to 1.0 % by weight of siloxane oil consisting of the recurring unit

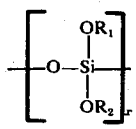

in which $R_1$ and $R_2$ each represents an alkyl radical, an aryl radical or an aralkyl radical, and x is an integer of from 10 to 10,000, the percentages being calculated on the polyethylene, at a chlorination temperature of from 50° C to 130° C, at least 10% by weight of chlorine being incorporated at a temperature of from 120° to 130° C.

2. Thermoplastic composition as claimed in claim 1, wherein the chloro-polyethylene used was prepared by chlorination starting at 50° to 100° C and ending at 120° to 130° C.

3. Thermoplastic composition as claimed in claim 1, wherein the chloro-polyethylene used was prepared by chlorination starting at 70° to 90° C and ending at 120° to 130° C.

4. Thermoplastic composition as claimed in claim 1, wherein the chlorinated low pressure polyethylene has a chlorine content of from 30 to 40 %.

5. Thermoplastic composition as claimed in claim 1, wherein the chlorinated polyethylene was prepared from low pressure polyethylene which had been thermally treated or presintered at a temperature in the range of from 100° C to its crystallite melting point.

6. Process for the manufacture of a thermoplastic composition by mixing
   a. 98 to 50% by weight of a vinyl chloride polymer and
   b. 2 to 50% by weight of a chlorinated low pressure polyethylene wherein the said polyethylene has a chlorine content of 25 to 42% by weight, a reduced specific viscosity of 1 to 5 dl/g, a residue value of 2 to 40%, measured by extraction in a 1 : 1 mixture of toluene and acetone, and a swelling value of 10 to 70%, measured in methylcyclohexane, and is prepared by chlorination in hydrochloric acid of 10 to 30% strength by weight in the presence of 0.1 to 2% by weight of silicic acid and 0.01 to 1.0% by weight of siloxane oil consisting of the recurring unit

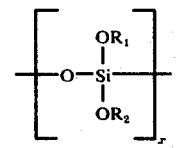

in which $R_1$ and $R_2$ each represents an alkyl radical, an aryl radical or an aralkyl radical, and x is an integer of from 10 to 10,000, the percentages being calculated on the polyethylene, at a chlorination temperature of from 50° C to 130° C, at least 10% by weight of the chlorine being incorporated at a temperature of from 120° to 130° C.

* * * * *